(12) United States Patent
Staples et al.

(10) Patent No.: US 10,881,045 B2
(45) Date of Patent: Jan. 5, 2021

(54) SYSTEM AND METHOD FOR PRESCRIBING FERTILIZER APPLICATION RATES FOR SPATIAL DISTRIBUTION OF A PRODUCT

(71) Applicant: Nutrien Ag Solutions (Canada) Inc., Calgary (CA)

(72) Inventors: Thomas Edward Staples, High River (CA); Regan Charles Miller, Carlyle (CA); Mehzabeen Hoosein, Washington, DC (US); Michael Vincent Finn, Potomac, MD (US)

(73) Assignee: NUTRIEN AG SOLUTIONS (CANADA) INC., Calgary (CA)

(*) Notice: Subject to any disclaimer, the term of this patent is extended or adjusted under 35 U.S.C. 154(b) by 42 days.

(21) Appl. No.: 16/081,327

(22) PCT Filed: Mar. 21, 2016

(86) PCT No.: PCT/CA2016/050323
§ 371 (c)(1),
(2) Date: Aug. 30, 2018

(87) PCT Pub. No.: WO2017/147682
PCT Pub. Date: Sep. 8, 2017

(65) Prior Publication Data
US 2019/0059203 A1    Feb. 28, 2019

Related U.S. Application Data

(60) Provisional application No. 62/303,856, filed on Mar. 4, 2016.

(51) Int. Cl.
*G06K 9/00*    (2006.01)
*A01B 79/00*    (2006.01)
(Continued)

(52) U.S. Cl.
CPC .......... *A01B 79/005* (2013.01); *A01C 21/007* (2013.01); *G06Q 50/02* (2013.01); *Y02A 40/10* (2018.01)

(58) Field of Classification Search
CPC combination set(s) only.
See application file for complete search history.

(56) References Cited

U.S. PATENT DOCUMENTS 6,889,620 B2    5/2005    Fraisse et al.
7,212,670 B1*   5/2007    Rousselle ............ G06K 9/0063
                                                            382/173
(Continued)

FOREIGN PATENT DOCUMENTS

CA    2392962 A1    1/2003

OTHER PUBLICATIONS

International Preliminary Report on Patentability issued in PCT/CA2016/050323, dated Sep. 13, 2018, 5 pages.
(Continued)

*Primary Examiner* — Alex Kok S Liew
(74) *Attorney, Agent, or Firm* — Faegre Drinker Biddle & Reath LLP

(57) ABSTRACT

A precision agriculture prescription system which provides precision agriculture prescriptions, by estimating fertilizer application rates and providing a prescription for spatial distribution of the selected product over a given field(s) with a goal of achieving an efficient use of budgeted fertilizer product(s). The system utilizes historical and forecast weather data, as well as remote sensing satellite imagery to maximize the grower's budgeted fertilizer products over his/her fields. This is done by assessing the normalized difference vegetation index (NDVI) from 1-to-many satellite images of the given field(s). The system also leverages regional historical weather data to correlate prior seasons'
(Continued)

growth patterns and climate effects, and regional weather forecast data to incorporate predictive climate impacts. A soil mineralization model is applied by the system to prescribe an efficient spatial distribution down to the image pixel level for the selected product(s) over the grower's field(s), to provide an economic advantage for the grower.

24 Claims, 13 Drawing Sheets

(51) Int. Cl.
    *A01C 21/00*     (2006.01)
    *G06Q 50/02*     (2012.01)

(56) References Cited

U.S. PATENT DOCUMENTS

| | | |
|---|---|---|
| 8,863,012 B2 | 10/2014 | Nara et al. |
| 2001/0016788 A1 | 8/2001 | Hauwiller et al. |
| 2003/0019408 A1 | 1/2003 | Fraisse et al. |
| 2015/0082491 A1* | 3/2015 | Albertsen ............ C07K 14/415 800/287 |
| 2015/0254800 A1* | 9/2015 | Johnson .................. C05C 11/00 382/141 |

OTHER PUBLICATIONS

International Search Report and Written Opinion issued in PCT/CA2016/050323, dated Nov. 1, 2016, 6 pages.

\* cited by examiner

Grower NAME Input Assignment

[Nitrogen]

| | | | Override | Y/N |
|---|---|---|---|---|
| Crop Type | | | Min Nitrogen | |
| % Organic Matter | | | Max Nitrogen | |
| N Budget | | | Solid | Y/N |
| Irrigated | Y/N | | Density | |
| Guaranteed Analysis | N | P | K | S |

Nitrogen Inputs

| Rx | Farm | Field | Acres | Crop Type | % Organic Matter | N Budget | Irrigated | N | P | K | S | Override | Min N | Max N | Solid | Density |
|---|---|---|---|---|---|---|---|---|---|---|---|---|---|---|---|---|
| | | | | | | | | | | | | | | | | |
| | | | | | | | | | | | | | | | | |
| | | | | | | | | | | | | | | | | |
| | | | | | | | | | | | | | | | | |
| | | | | | | | | | | | | | | | | |

FIG. 6

SYSTEM AND METHOD FOR PRESCRIBING FERTILIZER APPLICATION RATES FOR SPATIAL DISTRIBUTION OF A PRODUCT

CROSS-REFERENCE TO RELATED APPLICATION

This application is a U.S. 371 Application of International Application PCT/CA2016/050323, filed on Mar. 21, 2016, which claims the benefit of the U.S. Provisional Application No. 62/303,856, filed Mar. 4, 2016, both of which are herein incorporated by reference in their entirety.

TECHNICAL FIELD

The following relates to systems and methods for prescribing fertilizer application rates for spatial distribution of a product, particularly for distributing fertilizer product in an agricultural field.

DESCRIPTION OF THE RELATED ART

Fertilizers are widely used in agricultural applications such as farming to supply nutrients to the soil in order to yield crops from that soil. Efficient application of fertilizer is often desirable to manage both monetary and environmental costs. In some jurisdictions, there may also be regulations surrounding fertilizer usage, which makes such efficiencies a requirement.

To meet these efficiency needs, precision farming and precision agricultural techniques have been developed which utilize various technologies to vary the rate of fertilizer applied to particular fields in particular geographical areas. For example, global positioning systems (GPS), geographical information systems (GIS), and remote sensing have been utilized to apply fertilizer according to the needs of individual soils and soil types in these particular fields.

SUMMARY

The following provides a precision agriculture prescription system which provides precision agriculture prescriptions, by estimating fertilizer application rates and providing a prescription for spatial distribution of the selected product over a given field(s) with a goal of achieving an efficient use of budgeted fertilizer product(s).

The system can utilize historical and forecast weather data, as well as remote sensing satellite imagery to maximize the grower's budgeted fertilizer products over his/her fields. This can be done by assessing a vegetative index such as the normalized difference vegetation index (NDVI) from 1-to-many satellite images of the given field(s). The system can also leverage regional historical weather data to correlate prior seasons' growth patterns and climate effects, and regional weather forecast data to incorporate predictive climate impacts. A soil mineralization model can be applied by the system to prescribe an efficient spatial distribution down to, or lower than, the image pixel level for the selected product(s) over the grower's field(s), to provide an economic advantage for the grower.

In one aspect, there is provided a method of generating prescriptions for spatial distribution of fertilizer product, the method comprising: generating a mineralization map using one or more soil images for a field and mineralization data; generating vegetative index values for one or more vegetation images for the field, using weather information; determining a total available fertilizer budget for the field; determining a native soil nutrient supply from the field using the mineralization map; and generating a prescription map for the field that indicates a distribution of the fertilizer product in the total available fertilizer budget using field patterns determined from the vegetative index values, and taking into account the native soil nutrient supply determined from the mineralization map, and the weather information.

In another aspect, there is provided a computer readable medium comprising computer executable instructions for performing the method.

In yet another aspect, there is provided a precision agriculture system comprising a processor that can reside on a server, such as a cloud based server, and which executes computer readable instructions to operate the system according to the above method.

BRIEF DESCRIPTION OF THE DRAWINGS

Embodiments will now be described by way of example only with reference to the appended drawings wherein:

FIG. 6 is a screen shot of an example of a user interface for inputting fertilizer parameters;

DETAILED DESCRIPTION

Figure 1:
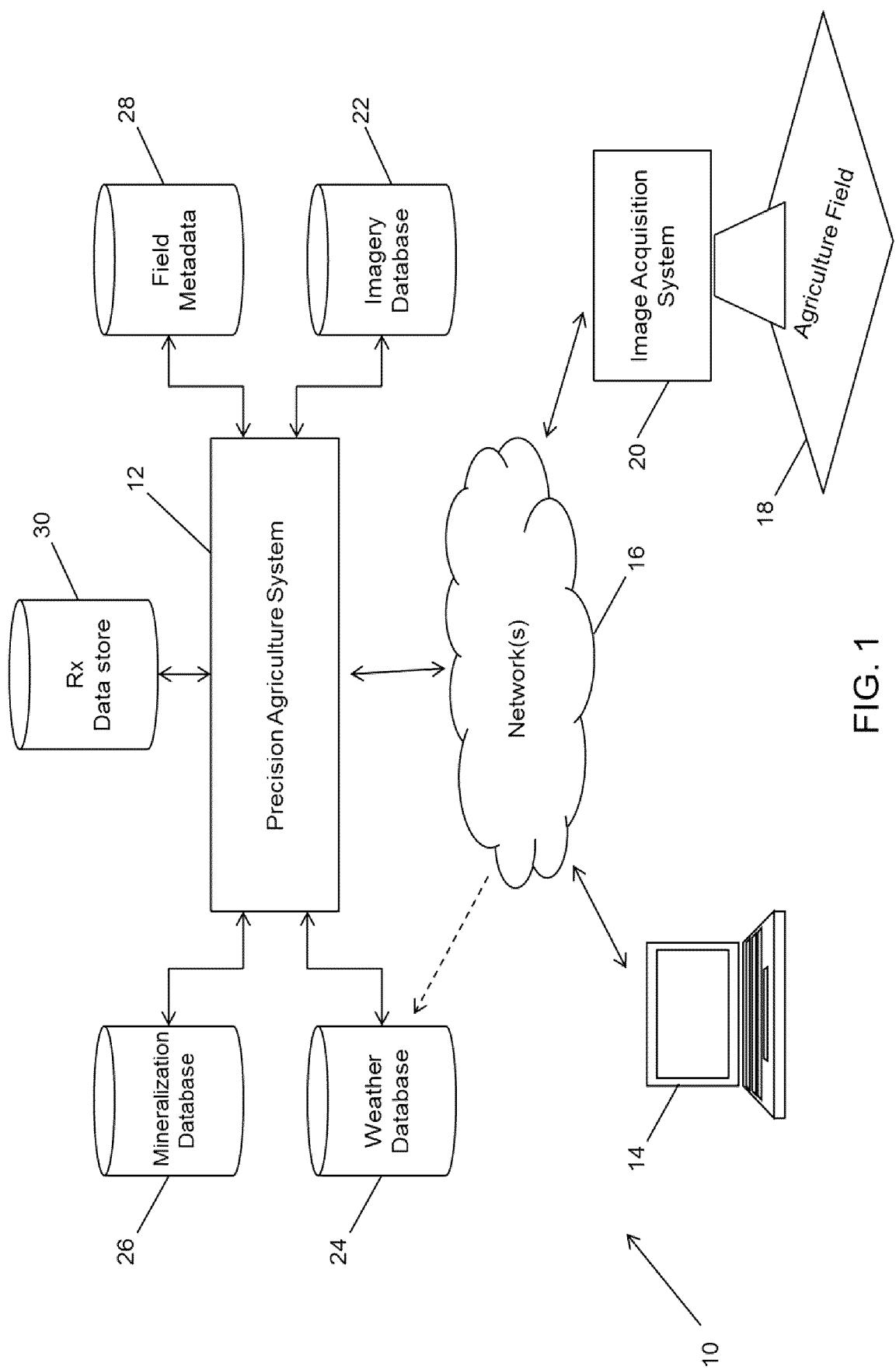
FIG. 1 is a block diagram of a precision agriculture system.

Turning now to the figures, FIG. 1 illustrates an example of a configuration for a precision agriculture platform 10 that includes a precision agriculture prescription system 12 (the "system" 12) for generating prescriptions for spatial distribution of a fertilizer product. In this example, the system 12 is accessible via a computing device 14 over one or more networks 16, including via wired or wireless connections. As such, the system 12 can be implemented as a cloud-based server or service that is accessible to various users in various locations. It can be appreciated that the implementation shown in FIG. 1 can also be implemented in a closed system within an organization and the widely distributed cloud computing based model is used only for illustrative purposes.

The system 12 generates prescriptions for the spatial distribution of particular fertilizer products over a given one or more agriculture fields 18. The system 12 utilizes imagery associated with the fields 18, which can be acquired using any available imaging technology such as remote sensing, using one or more image acquisition systems 20. The image acquisition 20 shown in FIG. 1 can provide acquired images to the system 12 for storage in an imagery database 22 or can upload such images directly to the imagery database 22 if granted suitable permissions and credentials. It can be appreciated that when images are acquired using other sources, not shown in FIG. 1, the computing device 14 can also be used to send images to the system 12 or upload them directly in a similar manner.

The system 12 includes or otherwise has access to various other data storage elements as illustrated in FIG. 1. A weather database 24 is utilized to obtain weather-related data (e.g., weather forecast data), and a mineralization database 26 is used to obtain soil mineral data to be used in generating a prescription for a particular field 18. The system 12 also utilizes field metadata 28 when other data related to the field 18 is available, and stores the generated prescriptions in a prescription (Rx) data store 30.

Figure 2:
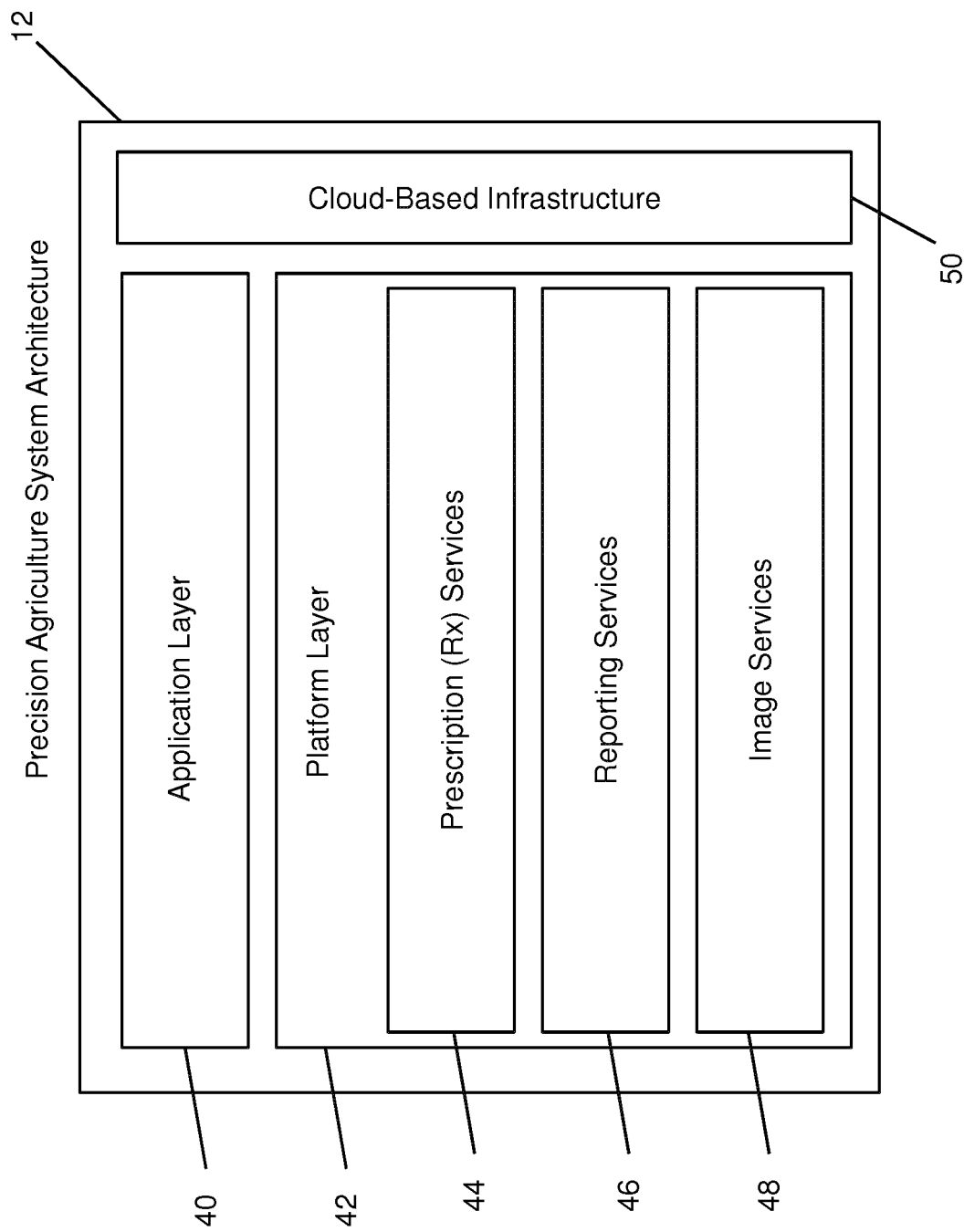
FIG. 2 is a block diagram of an example of a system architecture for the precision agriculture system.

As indicated, the system 12 can be implemented in various configurations and utilizing various technologies, such as a cloud-based deployment. FIG. 2 illustrates an example system architecture that can be used to implement the system 12. The system 12 in this example architecture includes an application layer 40 and a platform layer 42. The application layer 40 is an abstraction layer that specifies and is responsible for protocols and methods used by the computing devices 14 in the communication network within the platform 10, to enable an precision agriculture application to be utilized by a user on such a computing device 14. The platform layer 42 is an abstraction layer that specifies and is responsible for the services utilized by the platform 10 to generate prescriptions for particular fields 18. For example, as shown in FIG. 2, the platform layer 42 includes or otherwise provides prescription services 44 for generating the prescriptions, reporting services 46 for generating prescription reports, and image services 48 for enabling the application layer 40 to render images in a user interface as described in greater detail below, and to perform image processing that is used in prescription generation.

The system 12 also includes a cloud-based infrastructure component 50 for enabling a cloud-based deployment, however a server-based deployment is also possible.

Figure 3:
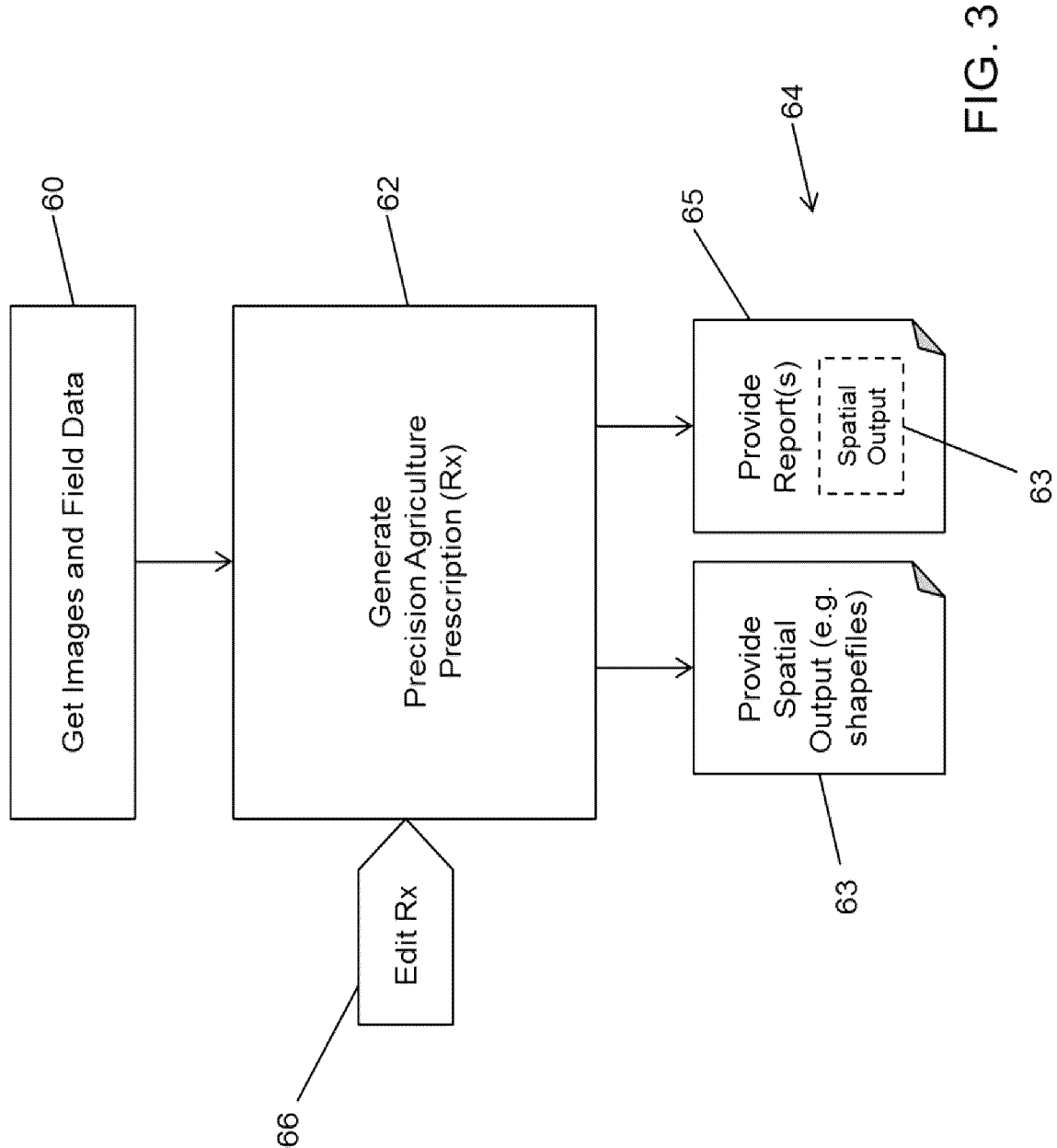
FIG. 3 is a flow diagram illustrating stages performed by a precision agriculture system in generating a precision agriculture prescription.

As shown in FIG. 3, at a high level, the system 12 operates to get images and field data for a particular field 18 in a first stage 60, to generate a precision agriculture prescription in a second stage 62, and to display, export or otherwise provide spatial outputs 63 (e.g., shapefiles) and/or reports 65 (which may optionally also include spatial outputs 63) at a third stage 64. This allows the data obtained in the first stage 60 to be output in a spatial output 63 such as a shapefile to illustrate the Rx map, or in a report 65 in the third stage 64, that is based on a process executed in the second stage 62. The second stage 62 can also include a sub-stage 66 or parallel process, that allows a user to edit a prescription based on an intermediate prescription as discussed below.

Figure 4:
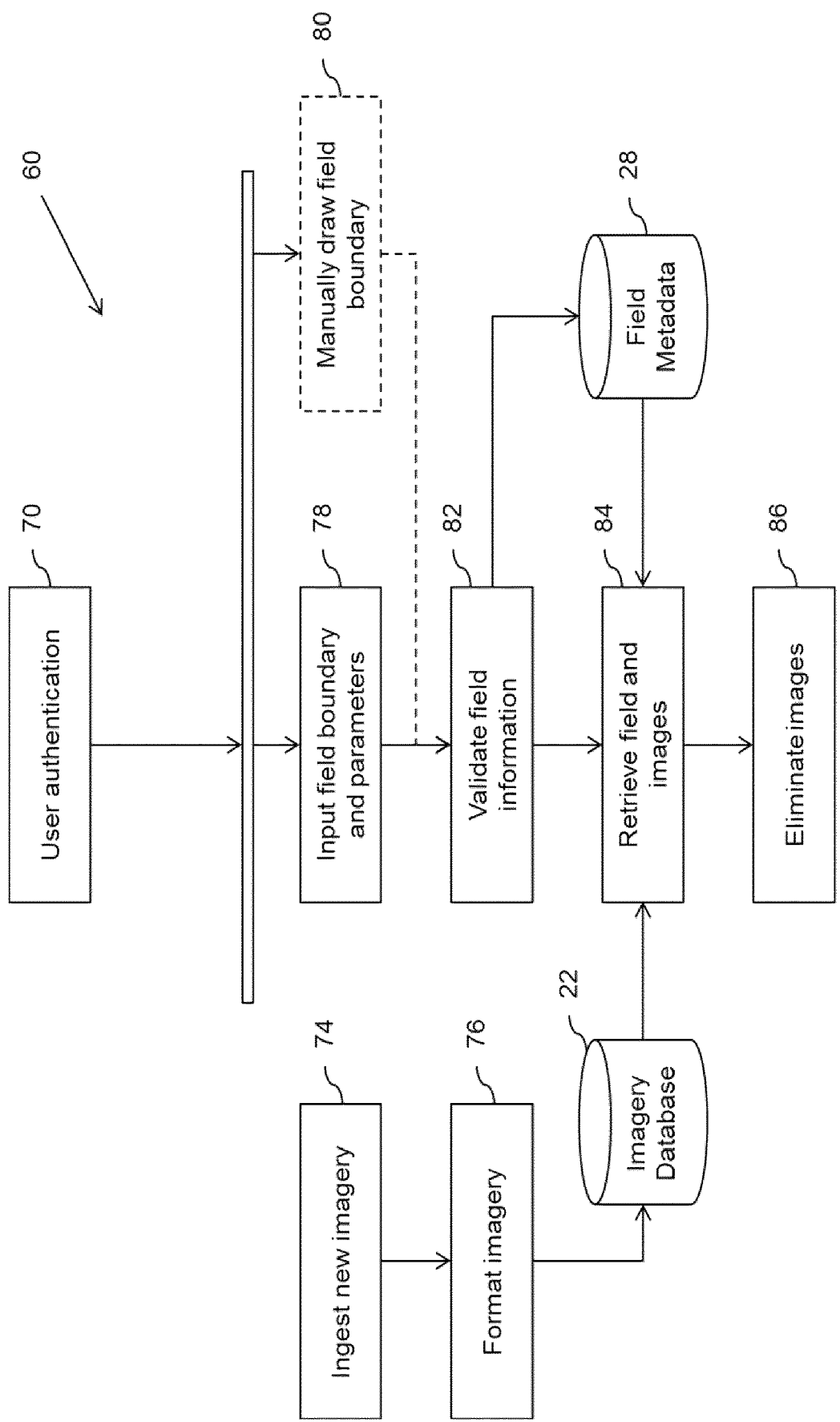
FIG. 4 is a flow chart illustrating operations performed in processing image data for generating a precision agriculture prescription.

FIG. 4 illustrates further detail regarding the first stage 60. In the first stage 60, user authentication occurs at 70, which enables a user to enter credentials (e.g., username and password, biometric inputs, etc.) to access the system 12, the credentials being validated by the system 12 at the server or cloud side, and/or by an application at a client terminal being used to access the system 12. The authentication performed at 70 can be configured to utilize various access control measures and permission levels to provide different levels of access to different users, if desired by the particular application or organization utilizing the system 12.

An asynchronous image ingestion process is also executed at 74, and the ingested imagery is formatted at 76 for storage in the imagery database 22. The imagery is obtained from imagery sources such as the image acquisition system 20. The images are assessed for cloud cover, image corrections when required are applied, geo-corrections, orthorectification, etc.

Once the user has been authenticated, an application is presented to the user to interact with using the computing device 14. The user enters field boundaries and attributes of the field at step 78, in any available format, for use in generating the prescription. This step can include an option to perform a batch import of multiple field boundary data and/or field definition shapefiles via an API. The attributes entered vary by the product type, but can include, for example, organic matter in the field 18, which is based on geography, a nitrogen (N) budget for the field 18, the crop to be planted, whether or not irrigation is used/available, drop years, prescription type, etc.

Figure 5:
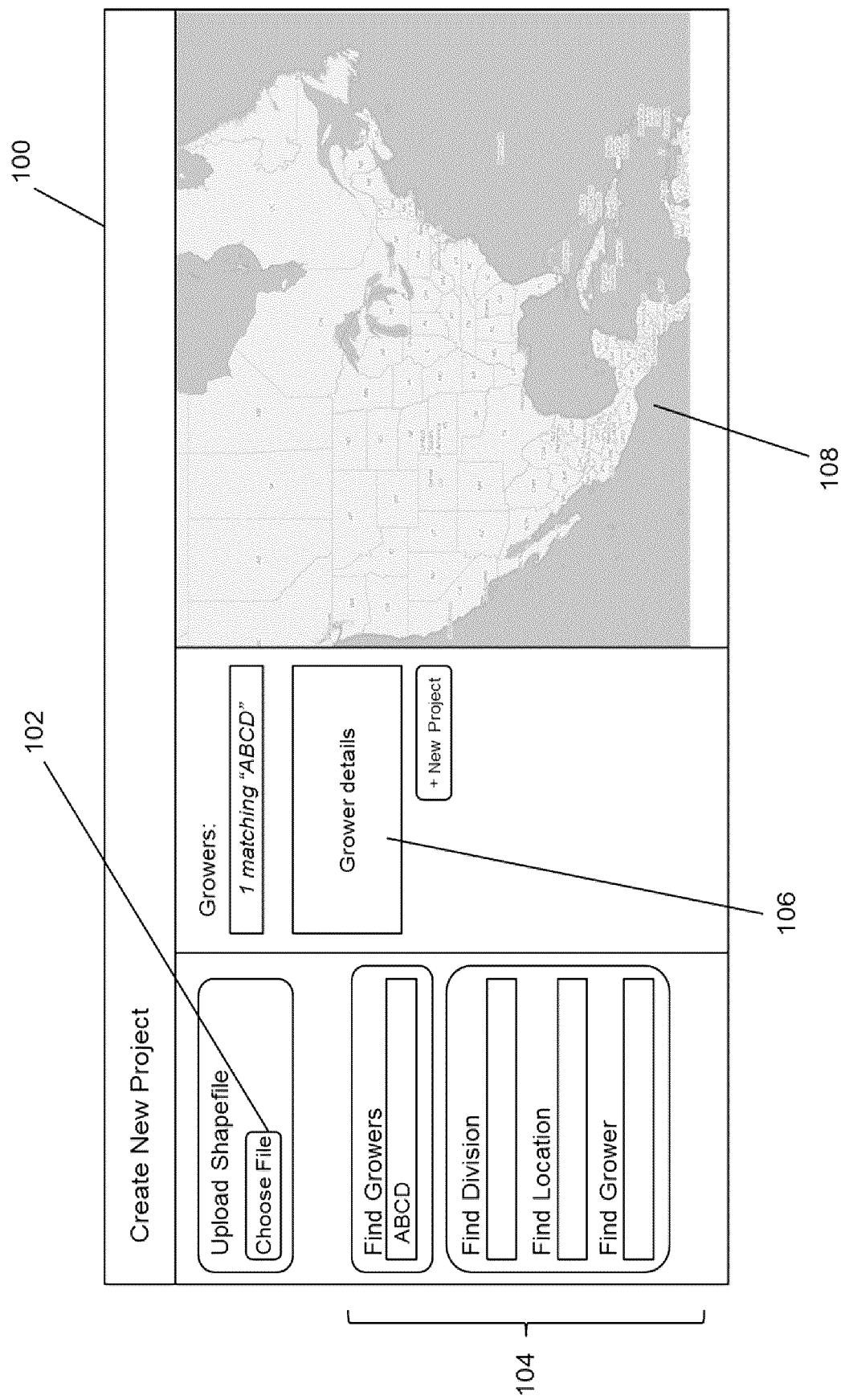
FIG. 5 is a screen shot of an example of a user interface for creating a new project and inputting field boundaries.

FIG. 5 illustrates a screen shot 100 of an example of a user interface for entering field boundaries, e.g., by selecting a Choose File button 102 to upload the shapefiles. As shown in FIG. 5, various search fields 104 can be provided to search for growers, divisions, locations, etc. In this example, grower details are provided as a search result 106. An image viewing pane 108 is also provided for viewing the shapefiles. FIG. 6 illustrates a screen shot 150 of an example of a user interface for entering the input parameters used to generate a prescription. In this example a Nitrogen prescription type option 152 has been selected, which displays the nitrogen inputs in a viewing pane 154. A series of input options 156 are also provided to enable the inputs to be entered, for example, crop type, % organic matter, N budget, irrigation information, guaranteed analysis to convert a rate from weight of a particular component (N/K/P/S) to a rate of a specified product (having a percentage of the component of interest), override option, minimum nitrogen, maximum nitrogen, solid information related to the product type, and density.

Figure 7:
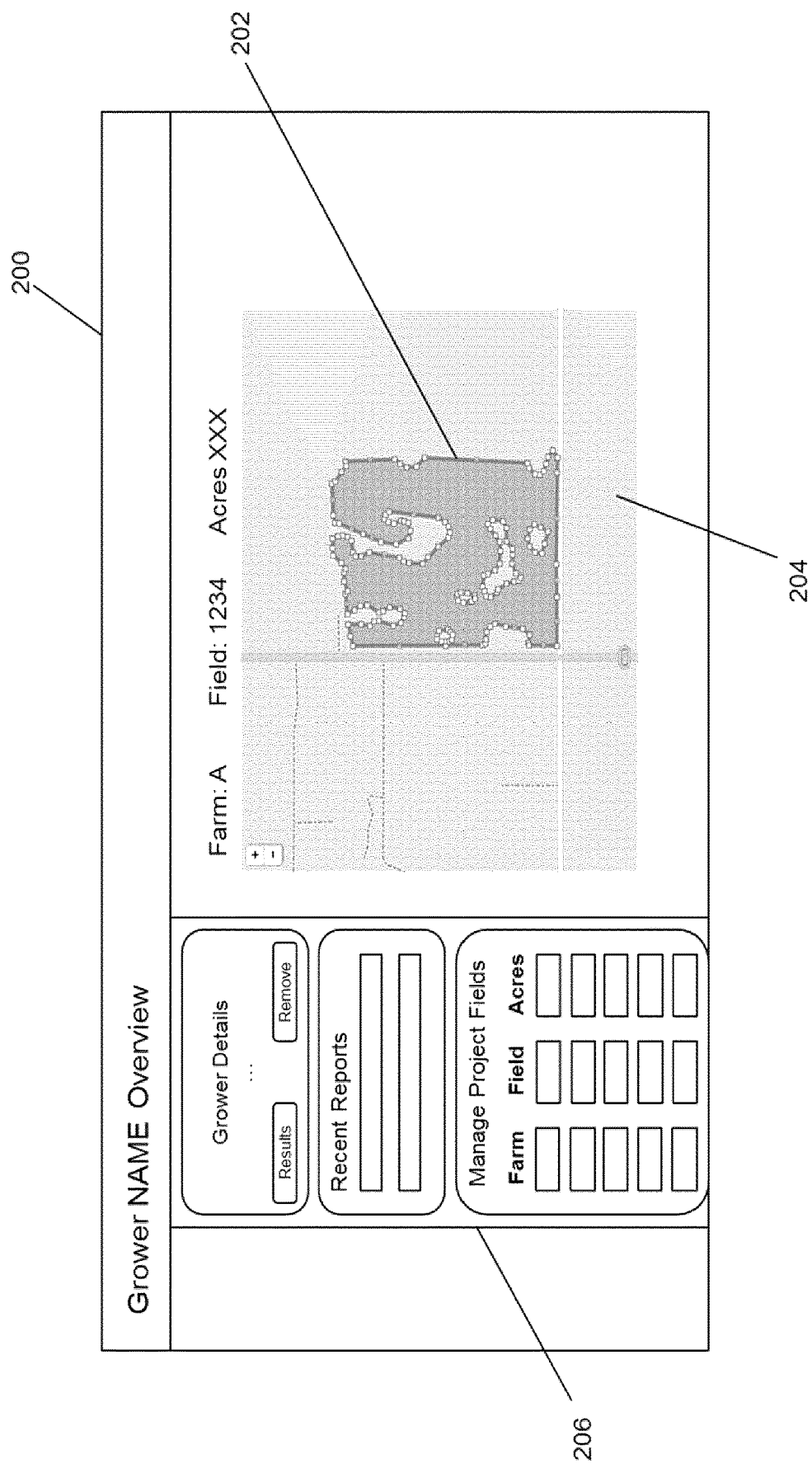
FIG. 7 is a screen shot of an example of a user interface for editing a field boundary.

In addition to inputting field boundaries and parameters in step 78, the user can also optionally manually draw a field boundary at step 80. This functionality provides a method for creating a field by drawing a polygon over a background image to define the field boundary. The product type and attributes mentioned above would also be associated with the manually drawn field. FIG. 7 illustrates a screen shot 200 of an example of a user interface for drawing and/or editing a field boundary 202. The field boundary 202 is displayed over a field image 204 and can be interacted with in order to edit the boundary 202 to better correspond to the field being fertilized. Various administrative options 206 are also shown, which can include grower details, access to recent reports, and a list of recently created/accessed projects.

The field boundaries input at 78 and 80 are then validated at step 82. The system 12 validates the correctness of the field boundaries and parameters that have been input to ensure that this data is not out of range or otherwise detectably incorrect. The valid data is then stored as field metadata 28. The system 12 then retrieves the field metadata 28 and the associated images from the imagery database 22 at step 84. The geographic location of the field 18 influences the image dates and image selection. For example, valid crop data ranges vary for geographic regions in say, Canada or the northern United States, versus regions in the southern United States or Mexico, since growing seasons can be drastically different.

Figure 8:
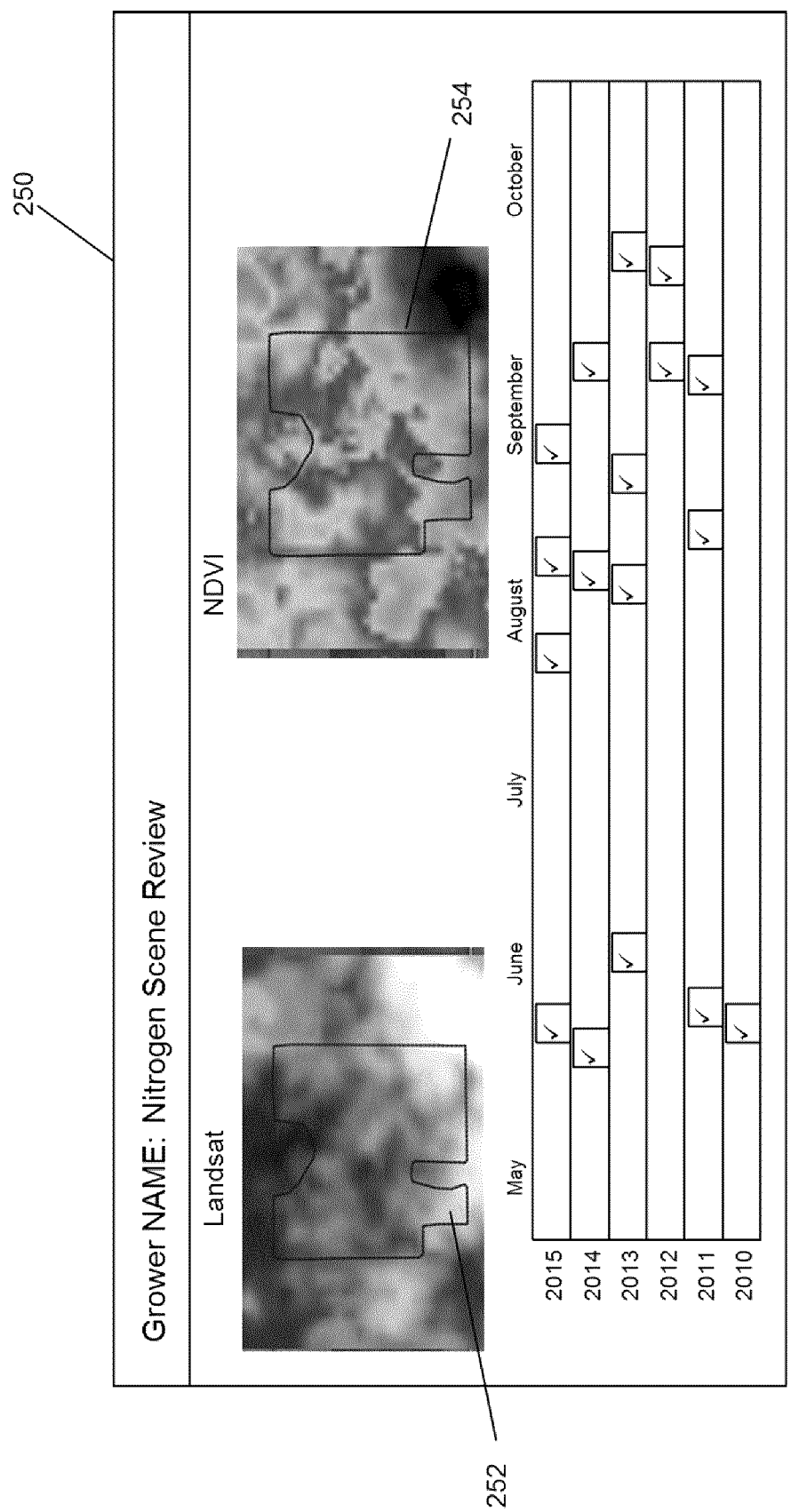
FIG. 8 is a screen shot of an example of a user interface for eliminating images.

When the images are retrieved, they are reviewed to eliminate images at 86. For example, some images from the set of images associated with the field 18 may not be usable due to cloud cover, snow cover, etc. A report of the selected images can also be generated during or upon completion of step 86. FIG. 8 illustrates a screen shot 250 of an example of a user interface for viewing and eliminating images. In the example shown in FIG. 8, a Landsat image 252 is displayed beside the calculated NDVI image 254.

Figure 9:
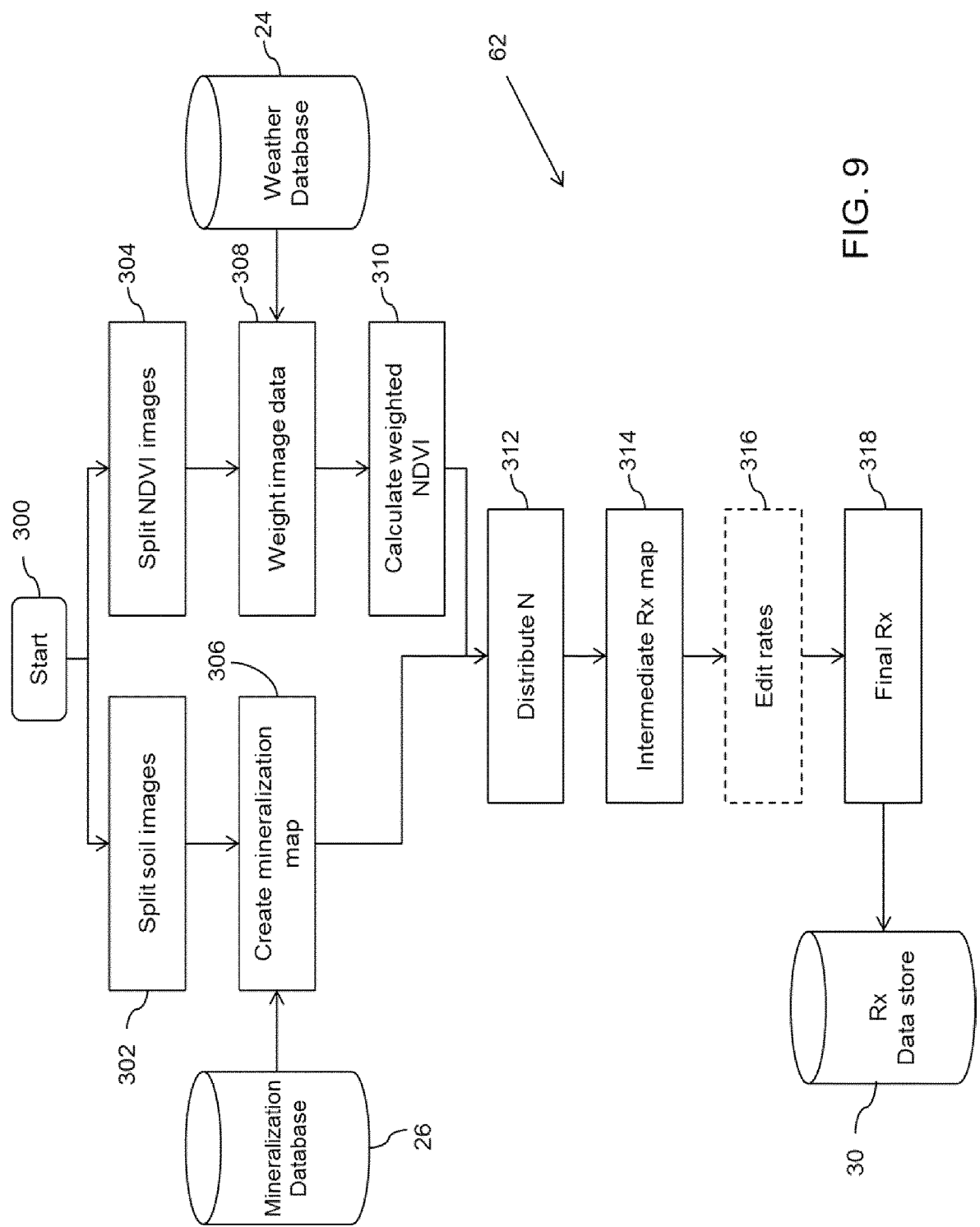
FIG. 9 is a flow chart illustrating operations performed in generating a precision agriculture prescription.

FIG. 9 illustrates operations performed by the system 12 in generating a prescription in stage 62, which can be exported, printed, displayed or otherwise provided as a report in stage 64. The prescription generation process starts at step 300 and begins by splitting the images for different processing, namely processing for soils and processing for those have a vegetative index associated therewith, such as the Normalized Difference Vegetation Index (NDVI) used herein as illustrative only. The image set is split into a sub-set of soil images at step 302 and a sub-set of NDVI images at 304 such that, for the collection of images available for that field, the system 12 determines which images are useful for soil calculations, and which are useful for NDVI calculations. For example, in a particular geographical region, the imagery used for soil content calculations are within the 20 April to 7 May date range when the images would capture tilled soil. In the same region, imagery used for NDVI calculations may be within the 21 June to 1 September range representing when a crop is likely to be shown in the images (i.e. having vegetation cover).

The soil images in 302 are used to create a mineralization map at 306. The mineralization map values are derived from the moisture determined from the soil content and a soil mineralization model, such as:

$$N_{total}=[N_{tert}+N_{mn}],$$

wherein $N_{tert}$ corresponds to the grower's fertilizer budget (for a particular field), which is typically a user input; and wherein $N_{mn}$ is derived at a pixel level using a soil moisture map and a Net Soil Nitrogen Mineralization Model from the mineralization database 26.

Calculating the $N_{mn}$ for each pixel can be performed as follows:

a) Eliminate pixels that include field with clouds of, for example, 5% or greater using band 1/thermal.

b) Eliminate images with pixel fill values which are images where no data from the satellite sensor is available.

c) Calculate median moisture ranking values per pixel.

d) Map to unit weight (e.g. pounds) of N from mineralization using the Net Soil Nitrogen Mineralization Model. Mapping using the Model can include the following parameters:

i) Organic matter for the field (user input or from a geography-based database);

ii) Plant nitrogen uptake efficiency factor;

iii) Time;

iv) Plateau factor for the area (e.g., in the United States); and v) Irrigated fields (user input).

The NDVI images obtained at step 304 are processed at step 308 to weight the image data. The image data is weighted using an algorithm that takes into account historical weather data and long range/seasonal forecasts obtained from the weather database 24. The weighting takes into account the number of images available for the given year, and analogous weather conditions, to provide the user with a weighted data set from which to calculate the weighted NDVI at step 310.

A distribution of N can now be determined at step 312, to generate a baseline N-budget from NDVI pixel content, and soil mineralization data. The NDVI calculation can be performed as follows, using the field boundaries and the appropriate input images within the appropriate date range (e.g., June 21 to September 1):

a) Eliminate images with fill values.

b) Apply default weights to images based on day, year, number of images in a year, weather (Wx weighting based on precipitation—If the upcoming year has a higher than normal expected precipitation, weight the images from years with above average precipitation higher).

c) Calculate the weighted mean for each pixel based on NDVI values from the stack. The images can also be further processed to improve the aesthetics of the output, if so desired.

The NDVI values at each pixel can be clipped to eliminate high or low values based on a ranking in the field. For example, an upper limit of the $98^{th}$ percentile and a lower limit of the $2^{nd}$ percentile can be used. The NDVI values are then transformed into an N interval depending on the N-budget or user override inputs.

An intermediate Rx map is then generated at step 314. This can be done using the transformed NDVI values by taking the total N needed in a unit of the field and subtracting the N from mineralization. That is, the N required for one unit of the field is computed by distributing the user input total N (i.e. the user-supplied N budget available) using field patterns observed by computing the NDVI values, and correcting for N from mineralization.

As shown in FIG. 9, the intermediate Rx map can be optionally edited by the user at step 316 to modify the Rx rates on the output from step 314. The editing can include, for example, entering checkstrips, field skirts, smoothing, and field merge operations. A checkstrip refers to a control sample area of the field where a standard amount of fertilizer is applied to provide a comparison sample against the rest of the field. A field skirt refers to an area of the field to which a user defined rate of fertilizer is to be applied. Smoothing refers to a setting to throttle/ramp up/down the application rate that prevents the application machinery from changing rates too quickly. Field merge operations refer to operations that combine multiple fields to generate a single prescription.

At step 318, a final Rx is generated by taking into account all of the received user inputs and the calculations described above. The output is provided in rates/classes, and different rates/classes can be provided as options for the output. Different areas of the field (classes) have different product rates prescribed, which makes the Rx a variable rate Rx. Depending on how much fertilizer is to be put on a given area of the field, a rate is selected to achieve that amount, according to the equipment available and how many rates it utilizes. The total N is converted to a rate based on the product to be used and the final Rx map is grouped into a rate map with 100 classes. The per-class N rate is then converted to a product rate, for example, lbs/acre for solid fertilizer, or gallons/acre for liquid fertilizer.

Figure 10:
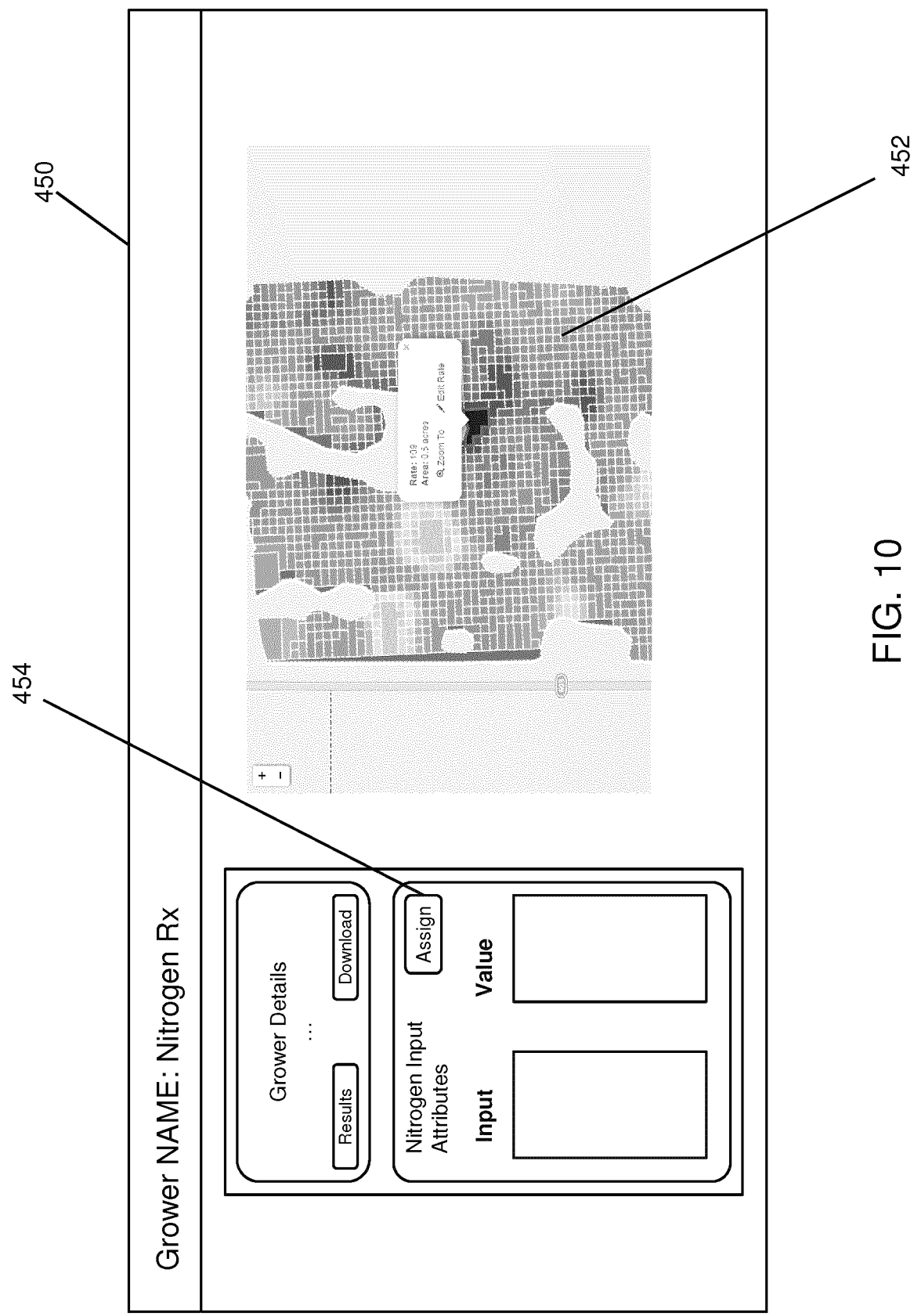
FIG. 10 is a screen shot of an example of a user interface for viewing and editing precision agriculture prescriptions.

FIG. 10 illustrates a screen shot 450 of an example of a user interface for viewing and editing an Rx. A color-coded image 452 can be displayed to illustrate the various N classes/rates to be applied to the regions of the field according to the variable rate Rx. The N input attributes can also be assigned using an Assign button 454, which enables a user-driven editing of the Rx rates. It can be appreciated that the Rx can be edited by away of a general defined override/substitute of an Rx rate.

The final Rx is then stored in the Rx data store 30. Moreover, as shown in FIG. 3, one or more reports can be provided at stage 64. The spatial outputs 63 and/or reports 65 can be formatted in any suitable manner and the shapefiles are generated for the generated Rx, which can be output as is, embedded in the reports 65 or provided as data that is reconstructed at a recipient location. Supporting data for the farmer, the field, etc. can also be included in such reports.

Figure 11:
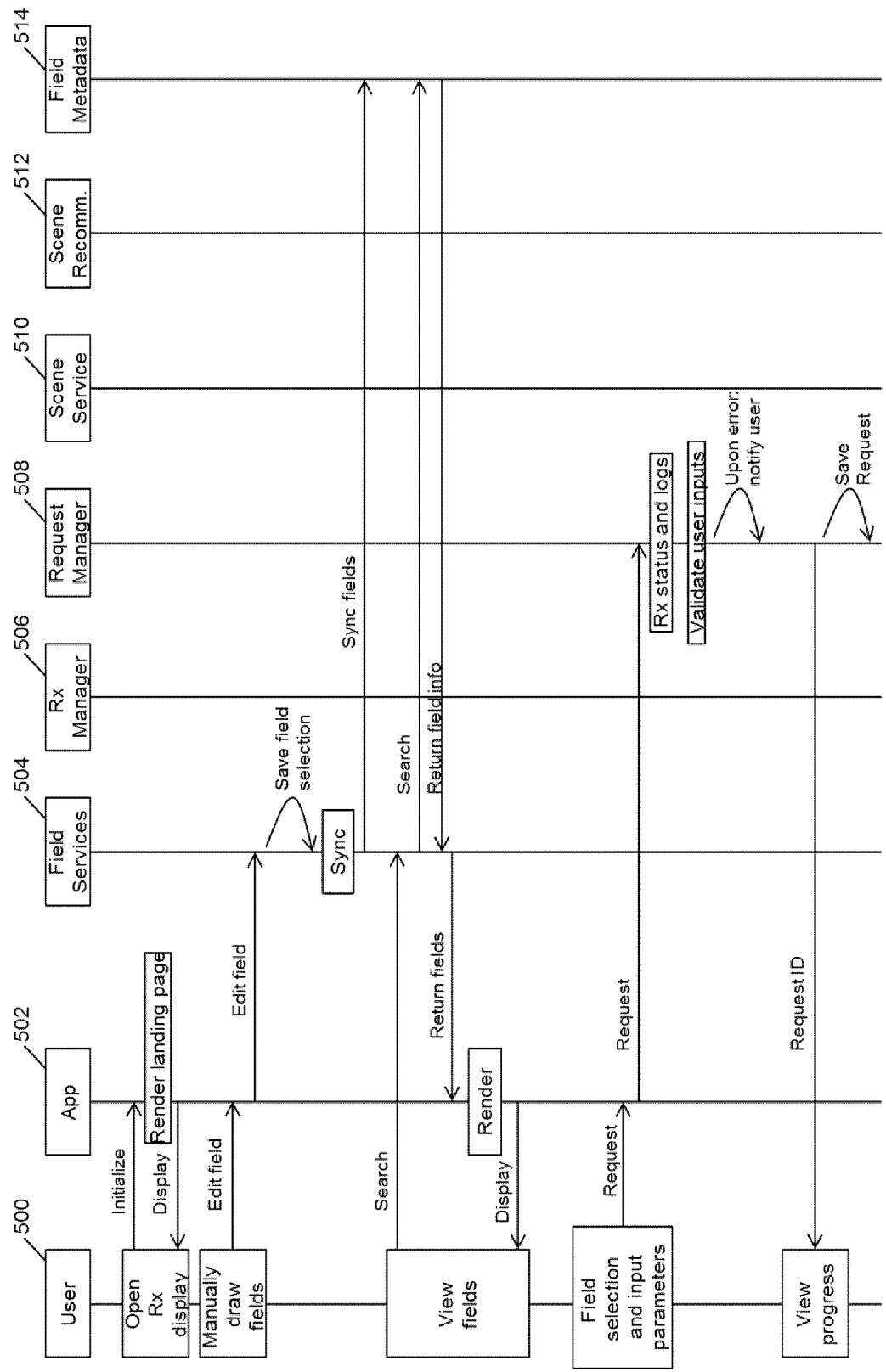
FIG. 11 is a sequence diagram illustrating computational interactions made by the system during an image processing stage.
Figure 12:
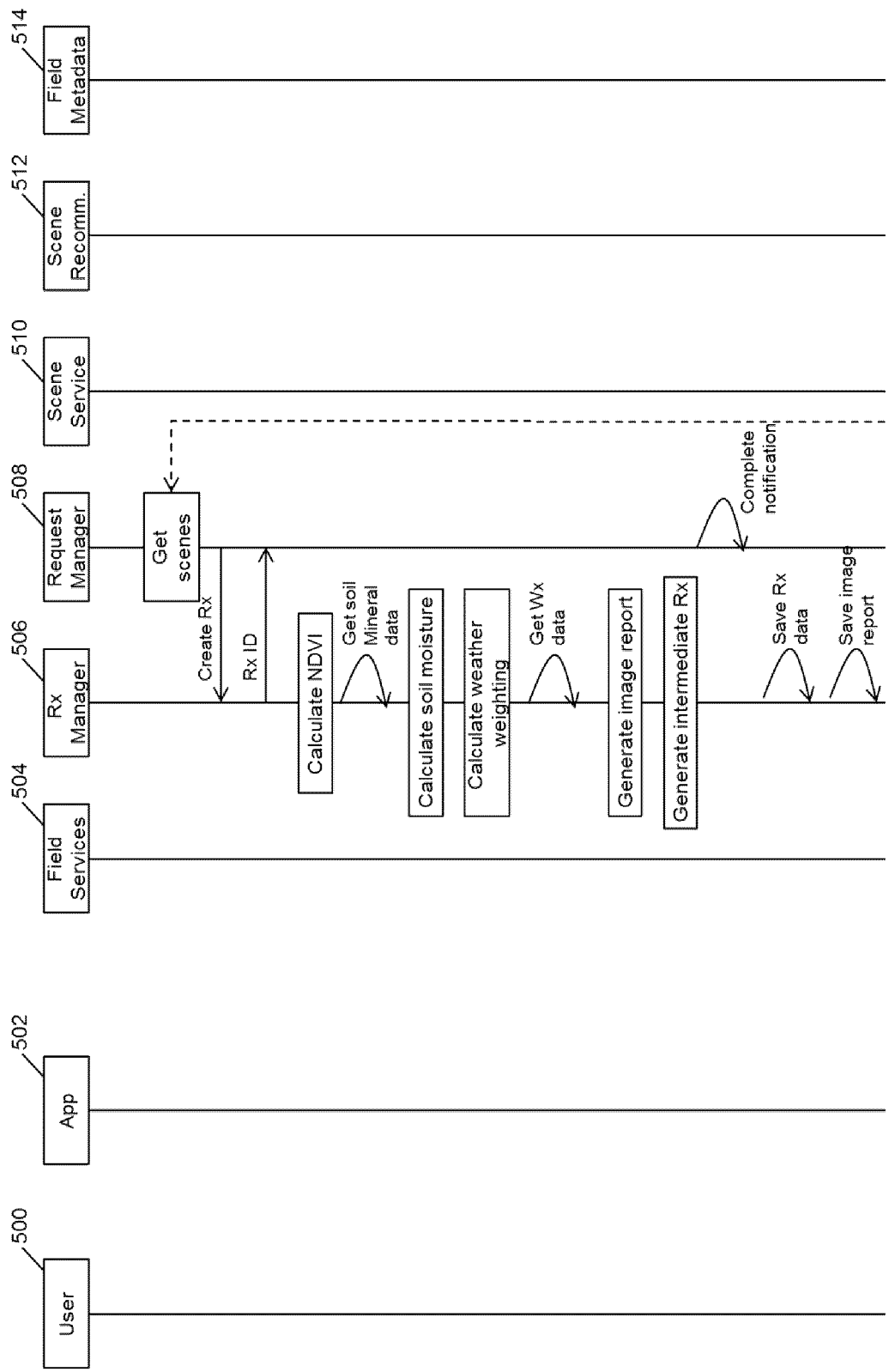
FIG. 12 is a sequence diagram illustrating computational interactions made by the system during a prescription generation stage.
Figure 13:
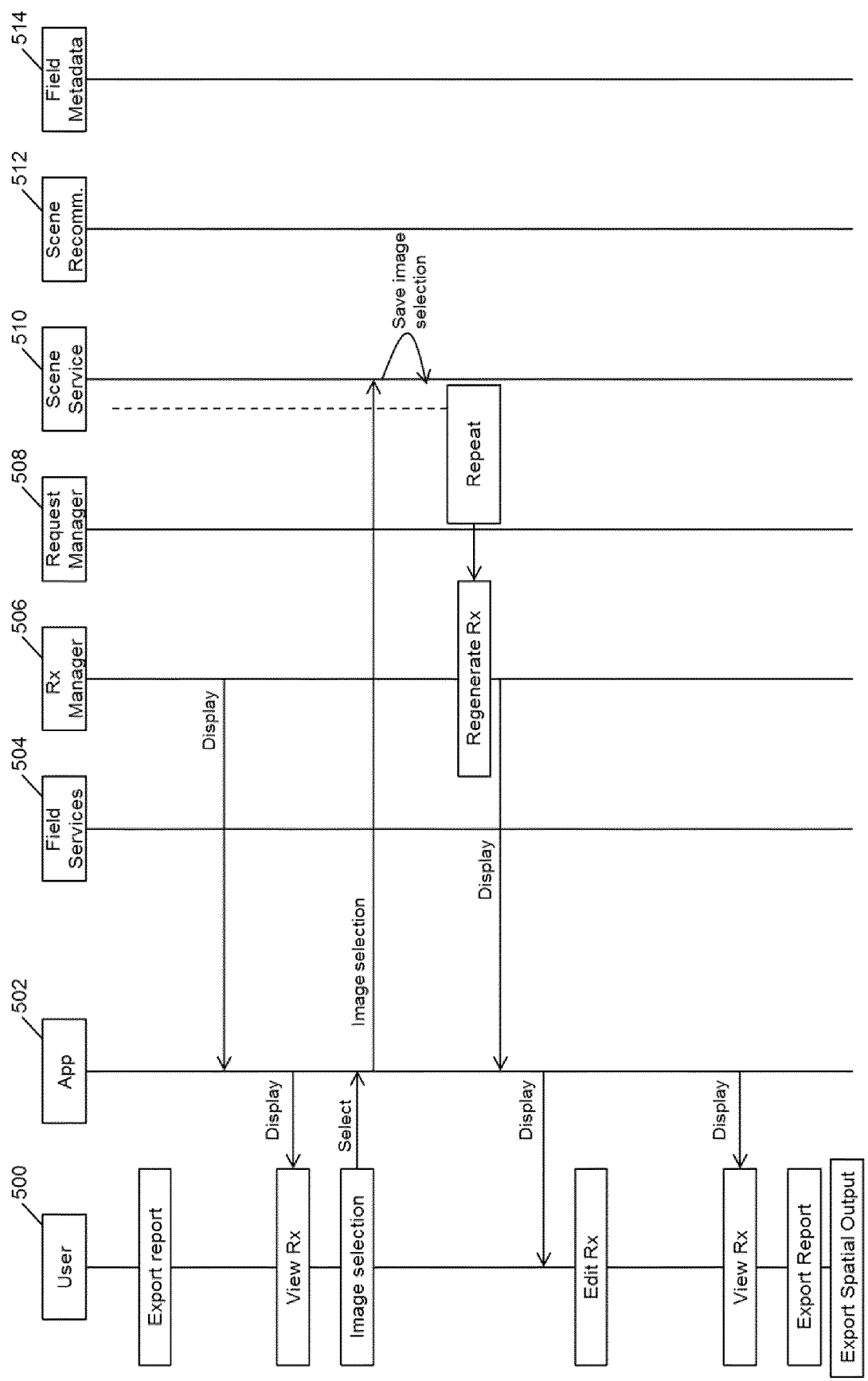
FIG. 13 is a sequence diagram illustrating computational interactions made by the system during a prescription viewing and editing stage.

Turning now to FIGS. 11 to 13, sequence diagrams are shown for an image processing stage (FIG. 11), a prescription generation stage (FIG. 12), and a prescription viewing and editing stage (FIG. 13) that is implemented by the system 10 using the example architecture shown in FIG. 2.

The sequence diagrams illustrate various data communications, data storage, and other interactions between several components in the system. However, these communications and interactions are purely illustrative and can be performed in other ways without departing from the principles discussed herein. A user 500 in this example interacts with an app 502. The app 502 interacts with several system components, which also are able to interact with each other as discussed below. These system components include field services 504, a Rx manager 506, a request manager 508, a scene service 510, a scene recommender 512 and field metadata 514 (e.g. stored in the field metadata data store 28).

In this example, the user 500 accesses the app 502 by opening an Rx display to initialize the app 502. This causes the app 502 to render a landing page which is displayed for the user 500 on their device. The user 500 may then manually draw the fields, when applicable. This issues an edit field command that is passed by the app 502 to the field services 504 to enable the field services 504 to save the field selection and synchronize the field metadata 28, by issuing a sync fields command to the field metadata 514 entity.

The user 500 can also view the fields and search for particular fields using the app 502. This is done by sending a search command to the field services 504, which accesses the field metadata 514. The field meta data 514 returns field information based on the search and the field services 504 returns the appropriate fields to the app 502. The app 502 renders the field information and displays this for the user 500.

Field selections and input parameters can be entered by the user 500, which generates a request that is passed along by the app 502 to the request manager 508. The request manager 508 determines an Rx status and logs the request. The user inputs are also validated by the request manager 508. It can be appreciated that as illustrated in FIG. 11, if an error is encountered, the user 500 is notified by the request manager 508. The request is saved and a request ID is returned by the request manager 508 to the user 500. The user 500 is then able to view the progress of the request by updating the application to show the user what is being processed, which is shown in FIG. 12.

As illustrated in FIG. 12, the request manager 508 performs a get scenes operation to gather the appropriate images, and creates an Rx for the Rx manager 506. The Rx manager 506 returns an Rx ID for the particular Rx being generated. The Rx manger 506 proceeds to calculate the NDVI, e.g., as described above. The Rx manager 506 also gets soil mineral data, calculates soil moisture, calculates weather weighting, gets Wx data, generates an image report and generates the intermediate Rx. The request manager 508 receives a complete notification (i.e. a notification that the process is complete) and the Rx manager 506 saves the Rx data in the Rx data store 30, and saves an image report in the imagery database 22.

As shown in FIG. 13, the user 500 selects an option to export a report and the Rx manager 506 communicates with the app 502 to display the report in order to allow the user 500 to view the Rx. The user 500 can also perform an image selection, which initiates a select command via the app 500, which is passed to the scene service 510. The scene service 510 saves the image selection and can repeat the operations in FIG. 12 if required, to re-calculate the NDVI and the Rx. The Rx is then displayed for the user 500 via the app 502, and the user 500 can initiate an edit Rx operation. This causes an edited Rx to be displayed using the app 502. The user 500 is then able to export a report and/or spatial output corresponding to the edited Rx.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the precision agriculture platform 10, any component of or related to the platform 10, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of generating prescriptions for spatial distribution of fertilizer product, the method comprising:
generating a mineralization map using one or more soil images for a field and mineralization data;
wherein the mineralization map is generated by determining a pixel level soil nutrient supply value using a soil moisture map and a mineralization model; and
wherein the pixel level soil nutrient value is calculated by:
eliminating pixels with a predetermined amount of cloud coverage;
eliminating images having fill values;
calculating moisture ranking values per pixel; and
mapping the moisture ranking values to a unit of weight;
generating vegetative index values for one or more vegetation images for the field, using weather information;
determining a total available fertilizer budget for the field;
determining a native soil nutrient supply from the field using the mineralization map; and
generating a prescription map for the field that indicates a distribution of the fertilizer product in the total available fertilizer budget using field patterns determined from the vegetative index values, and taking into account the native soil nutrient supply determined from the mineralization map, and the weather information.

2. The method of claim 1, wherein the prescription map is generated by:
generating an intermediate prescription map;
editing the intermediate prescription map according to at least one user input; and
generating a final prescription map based on the editing.

3. The method of claim 1, wherein the weather information is used to apply weights to the image data to calculate weighted vegetative index values.

4. The method of claim 1, wherein the fertilizer budget corresponds to a nitrogen budget.

5. The method of claim 1, further comprising outputting the prescription map.

6. The method of claim 5, wherein the prescription map is displayed in a user interface.

7. The method of claim 5, wherein the prescription map is provided in one or more reports and/or as a spatial output.

8. The method of claim 1, wherein the prescription map provides an image pixel level value indicative of a rate to apply the fertilizer product.

9. The method of claim 1, wherein the prescription map provides one of a predetermined number of rates to apply to each of a plurality of portions of the field.

10. The method of claim 1, wherein the vegetative index values are determined according to field boundaries and input images within a predetermined date range.

11. The method of claim 10, wherein the vegetative index values are determined, at least in part by:
eliminating images with fill values;
applying weights based on the weather information; and
calculating a weighted mean for each pixel based on the vegetative index values.

12. The method of claim 11, further comprising clipping the vegetative index values at each pixel to eliminate high and/or low values based on a ranking in the field.

13. The method of claim 12, further comprising transforming the clipped values into an interval based on the fertilizer budget.

14. The method of claim 1, wherein the prescription map is generated by subtracting the native soil nutrient supply available from a portion of the field from an amount of fertilizer prescribed for that portion of the field, and averaging the result according to the total available fertilizer budget.

15. The method of claim 1, further comprising separating a set of images into a first sub-set comprising the one or more soil images, and a second sub-set comprising the one or more vegetation images.

16. The method of claim 1, further comprising enabling field boundaries and parameters to be input.

17. The method of claim 16, further comprising enabling field boundaries to be manually drawn.

18. The method of claim 15, further comprising validating field information prior to obtaining the one or more soil images and the one or more vegetation images.

19. The method of claim 1, further comprising formatting newly obtained imagery and storing in an imagery database.

20. The method of claim 1, further comprising enabling at least one image to be eliminated based on one or more criteria.

21. The method of claim 1, wherein the vegetative index values correspond to normalized difference vegetation index (NDVI) values.

22. A computer readable storage medium comprising computer executable instructions for generating prescriptions for spatial distribution of fertilizer product, the computer executable instructions comprising instructions for performing the method of claim 1.

23. A system for generating prescriptions for spatial distribution of fertilizer product, the system comprising a processor and memory, the memory comprising computer executable instructions for causing the processor to perform the method of claim 1.

24. The system of claim 23, comprising a cloud-based precision agriculture architecture comprising one or more databases for storing imagery, mineralization information, weather information, and field metadata; the architecture configured to be accessible to a device for performing the method.

* * * * *